(12) United States Patent
Bloom et al.

(10) Patent No.: US 8,970,676 B2
(45) Date of Patent: Mar. 3, 2015

(54) STRUCTURED LIGHT SYSTEM

(71) Applicants: David M Bloom, Jackson, WY (US); Matthew A Leone, Jackson, WY (US)

(72) Inventors: David M Bloom, Jackson, WY (US); Matthew A Leone, Jackson, WY (US)

(73) Assignee: Alces Technology, Jackson, WY (US)

( * ) Notice: Subject to any disclaimer, the term of this patent is extended or adjusted under 35 U.S.C. 154(b) by 0 days.

(21) Appl. No.: 14/226,404

(22) Filed: Mar. 26, 2014

(65) Prior Publication Data

US 2014/0210948 A1 Jul. 31, 2014

Related U.S. Application Data

(62) Division of application No. 12/687,340, filed on Jan. 14, 2010, now Pat. No. 8,723,923.

(51) Int. Cl.
*H04N 13/02* (2006.01)
*G01B 11/25* (2006.01)

(52) U.S. Cl.
CPC ........... *H04N 13/0253* (2013.01); *G01B 11/25* (2013.01)
USPC .......................................................... 348/46

(58) Field of Classification Search
CPC ............................ G01B 11/25; H04N 13/0253
See application file for complete search history.

(56) References Cited

U.S. PATENT DOCUMENTS

| 6,388,754 | B1 | 5/2002 | Nishikawa et al. |
| 7,844,079 | B2 | 11/2010 | Hassebrook et al. |
| 2003/0021599 | A1 | 1/2003 | Brazas et al. |
| 2005/0046872 | A1 | 3/2005 | Hu et al. |
| 2005/0162615 | A1 | 7/2005 | Penn |
| 2008/0112677 | A1 | 5/2008 | Smith |
| 2008/0205748 | A1* | 8/2008 | Lee et al. ............... 382/154 |

FOREIGN PATENT DOCUMENTS

EP 1876568 A2 1/2008

OTHER PUBLICATIONS

"Super Resolution 3D Scanning Using Spatial Light Modulator and Band Correction", University of Kentucky Master's Theses, to Pethe.*
Ando, S.; Ono, N., "Spatio-temporal phase-encoding profilometry using correlation image sensor," Industrial Electronics, 2008. ISIE 2008. IEEE International Symposium on, vol., No., pp. 786,791, Jun. 30-Jul. 2, 2008.*
Search report and written opinion of the international searching authority in PCT/US2011/021198 Sep. 28, 2011.
Gorthi et al., "Fringe Projection Techniques: Whither we are?", Optics and Lasers in Engineering preprint, Sep. 2009.
Blais, "Review of 20 Years of Range Sensor Development", National Research Council Canada, Jan. 2004.
Indebetouw, "Profile measurement using projection of running fringes", Applied Optics, v 17, p. 2930, Sep. 1978.

(Continued)

*Primary Examiner* — Mehrdad Dastouri
*Assistant Examiner* — Mohammed Rahaman
(74) *Attorney, Agent, or Firm* — NUPAT, LLC; Morrison Ulman

(57) ABSTRACT

A structured light system based on a fast, linear array light modulator and an anamorphic optical system captures three-dimensional shape information at high rates and has strong resistance to interference from ambient light. A structured light system having a modulated light source offers improved signal to noise ratios. A wand permits single point detection of patterns in structured light systems.

13 Claims, 10 Drawing Sheets

(56) References Cited

OTHER PUBLICATIONS

Kimachi et al., "Real-Time Phase-Stamp Range Finder Using Correlation Image Sensor", IEEE Sensors J., v. 9, p. 1784, Dec. 2009.

Zhang et al., "Generic nonsinusoidal phase error correction for three-dimensional shape measurement using a digital video projector", Applied Optics, v. 46, p. 36, Jan. 2007.

Zhang et al., "High-resolution, real-time 3D absolute coordinate measurement based on a phase-shifting method", Optics Express, v. 14, p. 2644, Apr. 2006.

Ando et al., "Spatio-temporal phase-encoding profilometry using correlation image sensor", IEEE International Symposium on Industrial Electronics, p. 786, 2008.

Pethe, "Super resolution 3D scanning using spatial light modulator and band correction", University of Kentucky Masters Thesis, 2008.

Garcia et al., "Temporally-Consistent Phase Unwrapping for a Stereo-Assisted Structured Light System", IEEE 2011 Intl. Conf. 3D Imaging, Modeling, Processing, Visualization and Transmission, 2011.

Garcia et al., "Consistent Stereo-Assisted Absolute Phase Unwrapping Methods for Structured Light Systems", IEEE J. Selected Topics in Signal Processing, v. 6, p. 411, 2012.

Weise et al., "Fast 3D Scanning with Automatic Motion Compensation", IEEE, 2007.

\* cited by examiner

STRUCTURED LIGHT SYSTEM

RELATED APPLICATIONS

This application is a division of "Structured light system", U.S. patent application Ser. No. 12/687,340, filed on 14 Jan. 2010. This application is related to "Compact display system", U.S. patent application Ser. No. 12/687,306, filed on 14 Jan. 2010, and incorporated herein by reference.

TECHNICAL FIELD

The disclosure is generally related to the field of three-dimensional shape detection with structured light.

BACKGROUND

"Structured light" systems determine the three-dimensional shape of objects. Such systems typically include a projector and a camera separated by a baseline distance. The projector illuminates an object with known light patterns, often series of parallel stripes. The appearance of the patterns as seen by the camera reveals depth information about the object. Structured light is sometimes referred to as "fringe projection" or "pattern projection". Alternative techniques for shape determination include laser scanning, slit scanning, time-of-flight measurements, and interferometry.

Current structured light systems deliver good performance in terms of depth resolution. However they often require careful lighting control so that pattern detection is not swamped by ambient light. Time-of-flight systems offer better ambient light rejection due to their high modulation frequency, but that frequency also determines the depth resolution. Fine depth resolution with a time-of-flight system may require unrealistically high modulation frequencies.

What is needed is a structured light system offering good depth resolution that also has improved immunity to ambient light in a useful bandwidth.

DETAILED DESCRIPTION

Structured light systems measure the three dimensional shape of objects. A structured light system includes a light source and a pattern generator that together form a projector, and a camera. The camera measures the appearance of patterns projected onto objects by the projector. The observed phase of a periodic pattern is related to the topography or depth of the object that it illuminates. The camera, or an external electronic system, demodulates images to determine the phase of patterns.

Structured light systems may also be used to find the three dimensional position of small objects as they move around in a volume illuminated by a structured light projector. Structured light systems may therefore be used for detection in new, three-dimensional human interface devices such as game controllers. An advanced interface can respond to gestures such as hand waving, pointing, or smiling if it can rapidly detect the position and shape of a person's hand or face.

Structured light systems described here operate at high speed and are robust in the presence of noise from ambient light sources. A fast, linear array light modulator and an anamorphic optical system are used to project light patterns having sinusoidal variation in one direction. The patterns may be detected synchronously for high speed extraction of phase information from camera images while maintaining high signal-to-noise ratios.

An alternate system incorporates a conventional pattern generator but uses a light source that is modulated at high speed. In this case synchronous detection improves signal-to-noise ratios, leading to better performance in the presence of interfering light sources.

A simplified, single-point depth detection device is also described. This device has many applications including video game controllers, robotic surgery, sports scoring systems, etc.

Figure 1:
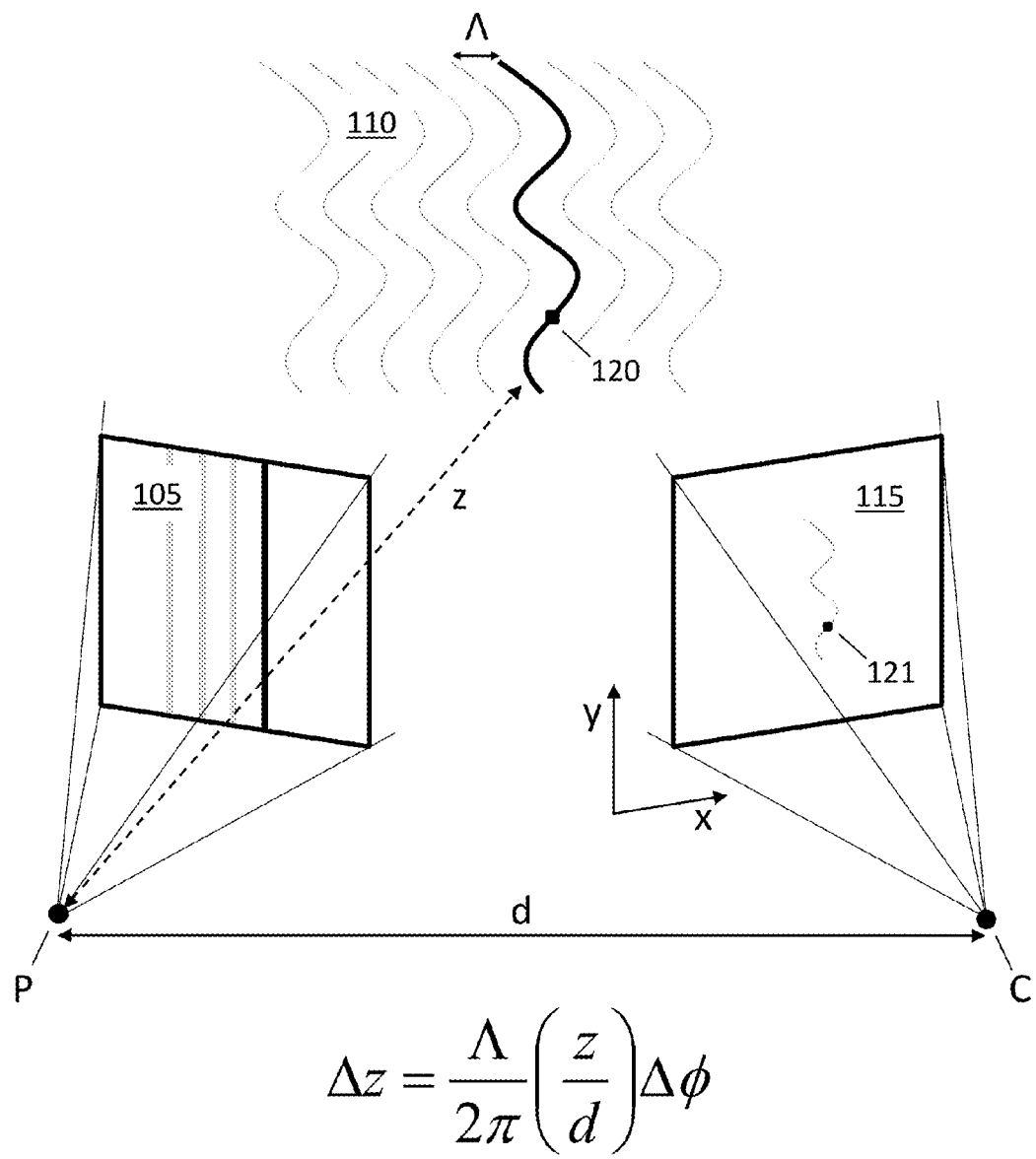
FIG. 1 shows geometrical relationships in a structured light system.

FIG. 1 shows geometrical relationships in a structured light system. In FIG. 1 a pattern projector located at point "P" generates a sinusoidal stripe pattern 105 that illuminates a three-dimensional surface located a distance, z, away from the projector. A camera located at point "C" views the pattern 110 that stripes 105 make when they illuminate the surface. The camera records the (X, Y) location of points in pattern 110 as they appear on the camera's image sensor 115. For example point 120 on the surface corresponds to point 121 in the camera. The camera is separated from the projector by baseline distance, d. The depth resolution, $\Delta z$, of the system is given by:

$$\Delta z = \frac{\Lambda}{2\pi}\left(\frac{z}{d}\right)\Delta\phi.$$

Here, $\Lambda$ is the period, and $\phi$ is the phase, of pattern 110. The precision with which the phase of pattern 110 is resolved leads directly to the precision of depth information obtained by the system.

Figure 2:
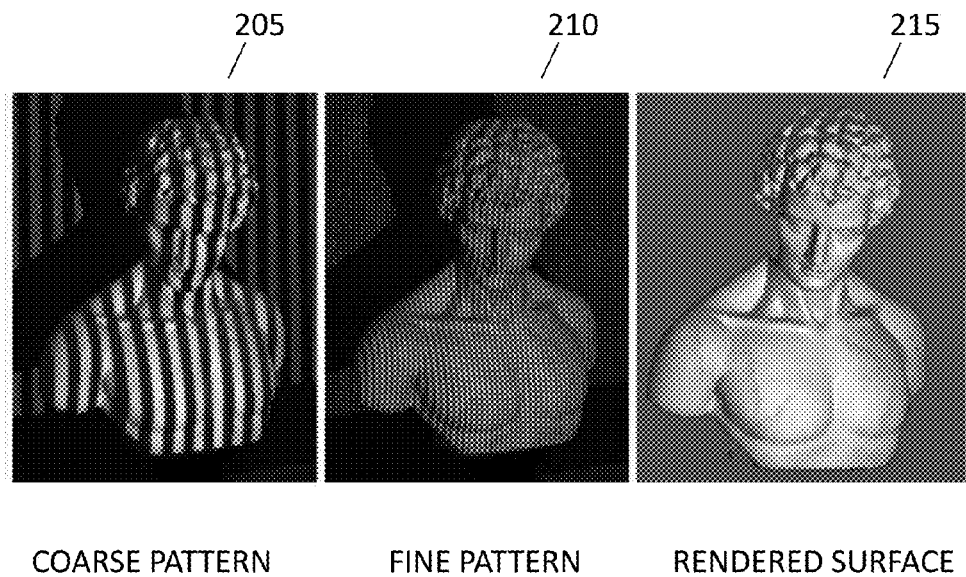
FIG. 2 shows structured light patterns projected on a three-dimensional object and a digital rendering of the object.

FIG. 2 shows structured light patterns projected on a three-dimensional object and a digital rendering of the object. In FIG. 2, "coarse pattern" 205 and "fine pattern 210" images show a bust illuminated by patterns analogous to pattern 110 of FIG. 1. The period, $\Lambda$, of the coarse pattern is greater than that of the fine pattern. Structured light patterns having short periods provide better depth resolution than long period patterns. However, depth ambiguities may result if the range of depths to be measured is large. Illumination of objects with patterns having different periods is a technique that is helpful to resolve such ambiguities. "Rendered surface" 215 shows a computer rendering of the three-dimensional surface detected in images 205 and 210.

Figure 3:
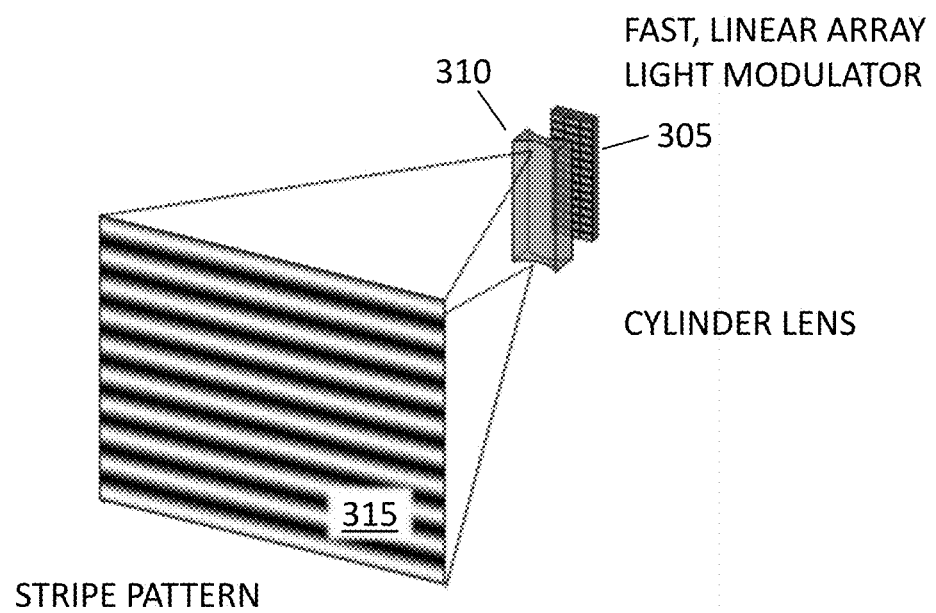
FIG. 3 shows a fast, linear array light modulator and an anamorphic optical system projecting a stripe pattern.

FIG. 3 shows a fast, linear array light modulator 305 and an anamorphic optical system (illustrated as cylinder lens 310) projecting a stripe pattern 315. A fast, linear array light modulator is a device that creates a line image; i.e. a linear array of pixels. An example of a promising family of modulators suitable for structured light projection is modulators based on micromechanical ribbons. Micromechanical ribbon devices may have rise or fall transition times as short as roughly 20 nanoseconds to roughly 200 nanoseconds. Therefore, in this disclosure, "fast" linear array light modulators are those capable of operation with repetition rates in the megahertz range; e.g. from roughly 2 MHz through roughly 20 MHz. The actual operating rate may of course be slower than the maximum possible rate. Ribbon devices may be operated in an analog mode so that any desired degree of ribbon deflection may be achieved at high repetition rate.

A new type of micromechanical ribbon-based, fast, linear array light modulator is described in "Display system", U.S. patent application Ser. No. 12/482,686, filed on 11 Jun. 2009, and incorporated herein by reference. A variation of the display system is described in "Compact display system", U.S. patent application Ser. No. 12/687,306, filed on 14 Jan. 2010, and incorporated herein by reference. A third type of micromechanical ribbon-based, fast, linear array light modulator is described in "Scanned, one-dimensional, phased-array display system", U.S. patent application Ser. No. 12/164,030, filed on 28 Jun. 2008, and incorporated herein by reference. Other types of linear array light modulators may be constructed from micromechanical tilting mirror, liquid crystal, liquid crystal on silicon, or other technologies, although none of these matches the speed of ribbon devices.

Cylinder lens 310 spreads a line image generated by linear array light modulator 305 into stripe pattern 315. Of course, a stripe pattern is just one example of a two-dimensional pattern that may be obtained from a line image. In general, the combination of a linear array light modulator and an anamorphic optical system creates a two-dimensional pattern having one-dimensional variation. Thus the "stripes" of FIG. 3 could be a sinusoidally varying brightness pattern or any other pattern of arbitrary profile. Arbitrary patterns may be thought of as being composed of a set of sinusoidal patterns of different amplitudes and frequencies.

Cylinder lens 310 may be generalized to any anamorphic optical system that forms an image of the linear array in the direction parallel to the length of the array and spreads light out in the perpendicular direction. The anamorphic optical system may use refractive and/or diffractive optical elements, and some elements may perform more than one function. For example, an anamorphic lens may form an image in one dimension while allowing light to spread out in an orthogonal dimension, as just mentioned, and simultaneously function as a projection lens.

Figure 4:
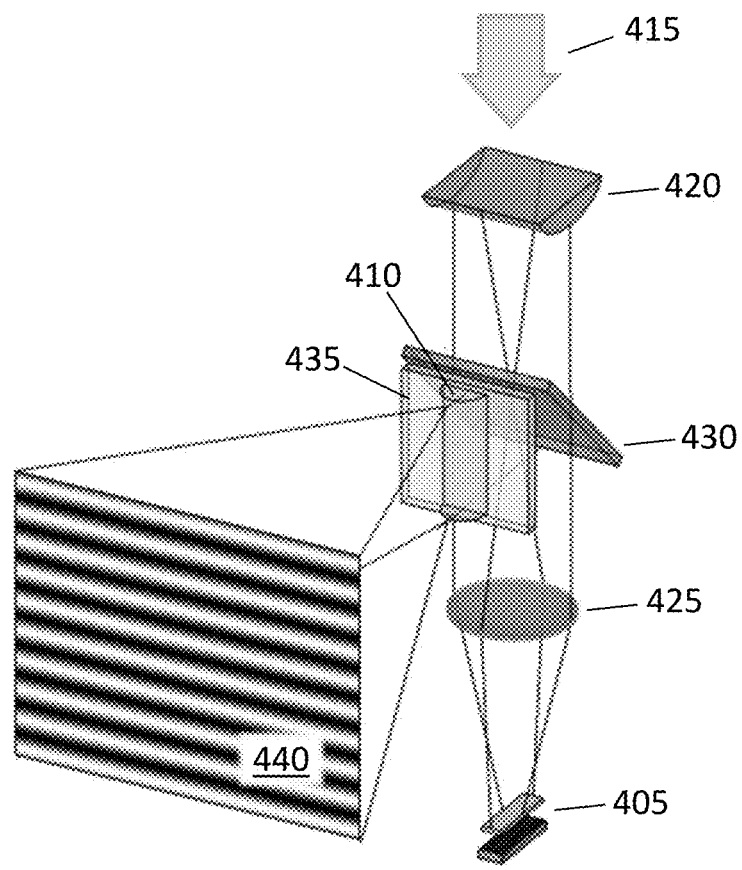
FIG. 4 shows a structured light projector based on a fast, linear array light modulator.

FIG. 4 shows a structured light projector based on a fast, linear array light modulator. In FIG. 4, a linear array light modulator 405, based on an array of micromechanical ribbons, creates a line image that is spread into a two-dimensional image 440 by cylinder lens 410. Image 440 has variations in only one direction corresponding to the linear extent of the modulator. Light from light source 415 is focused by lenses 420 and 425 onto the modulator. Cylinder lens 420 shapes the illumination to the long dimension of the modulator while lens 425 also serves as a projection lens for the system. Beam splitter 430 directs the projected beam through cylinder lens 410. The projector of FIG. 4 is one example of a projector suitable for structured light applications using a linear light modulator.

Figure 5:
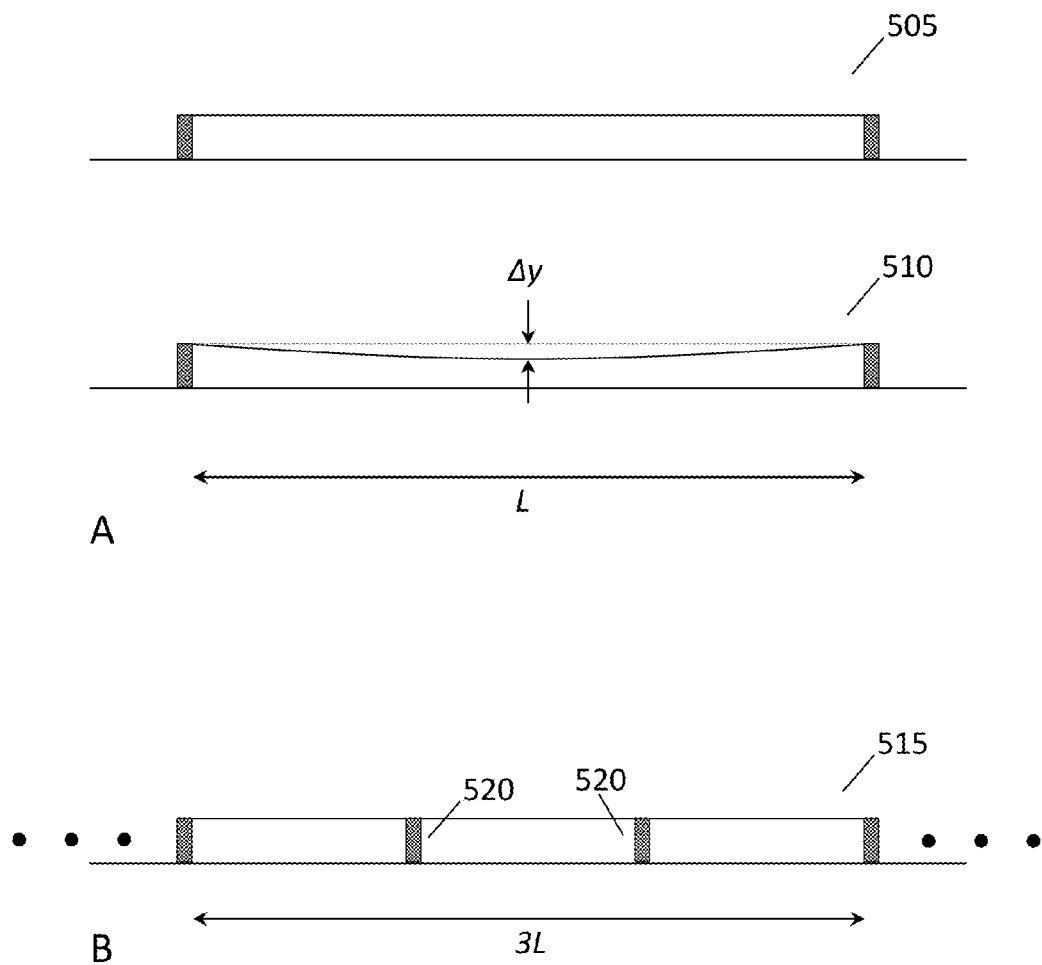
FIGS. 5A and 5B show micromechanical ribbon structures that may be found in some types of fast, linear array light modulator.

FIGS. 5A and 5B show micromechanical ribbon structures that may be found in some types of fast, linear array light modulator such as modulator 405 in FIG. 4. In FIG. 5A a micromechanical ribbon is shown at rest 505 and deflected 510. The length of the ribbon is L. The transition time between rest and deflected states may be as short as roughly 20 nanoseconds to roughly 200 nanoseconds. Several different optical techniques have been developed to convert phase shifts imparted to light reflected by a micromechanical ribbon into optical intensity variations. FIG. 5B shows an alternate structure in which a long ribbon 515 of length 3L is supported by intermediate supports 520. The structure of FIG. 5B has the same fast switching speed as that of FIG. 5A, but is compatible with illumination systems that cannot be focused within distance L. For example, light emitting diodes sources cannot be focused as tightly as laser sources. End-to-end ribbon structure 515 is analogous to three ribbon structures of FIG. 5A mounted end to end, but of course structures like that of FIG. 5B may be made with two, three, four, or any number of end-to-end units. Long ribbons with intermediate supports are usually unsuitable for display applications using linear light modulators, but in the case of structured light a line image is spread out by an anamorphic optical system (e.g. lens 310 in FIG. 3) so intra-pixel variations have no consequence.

Figure 6:
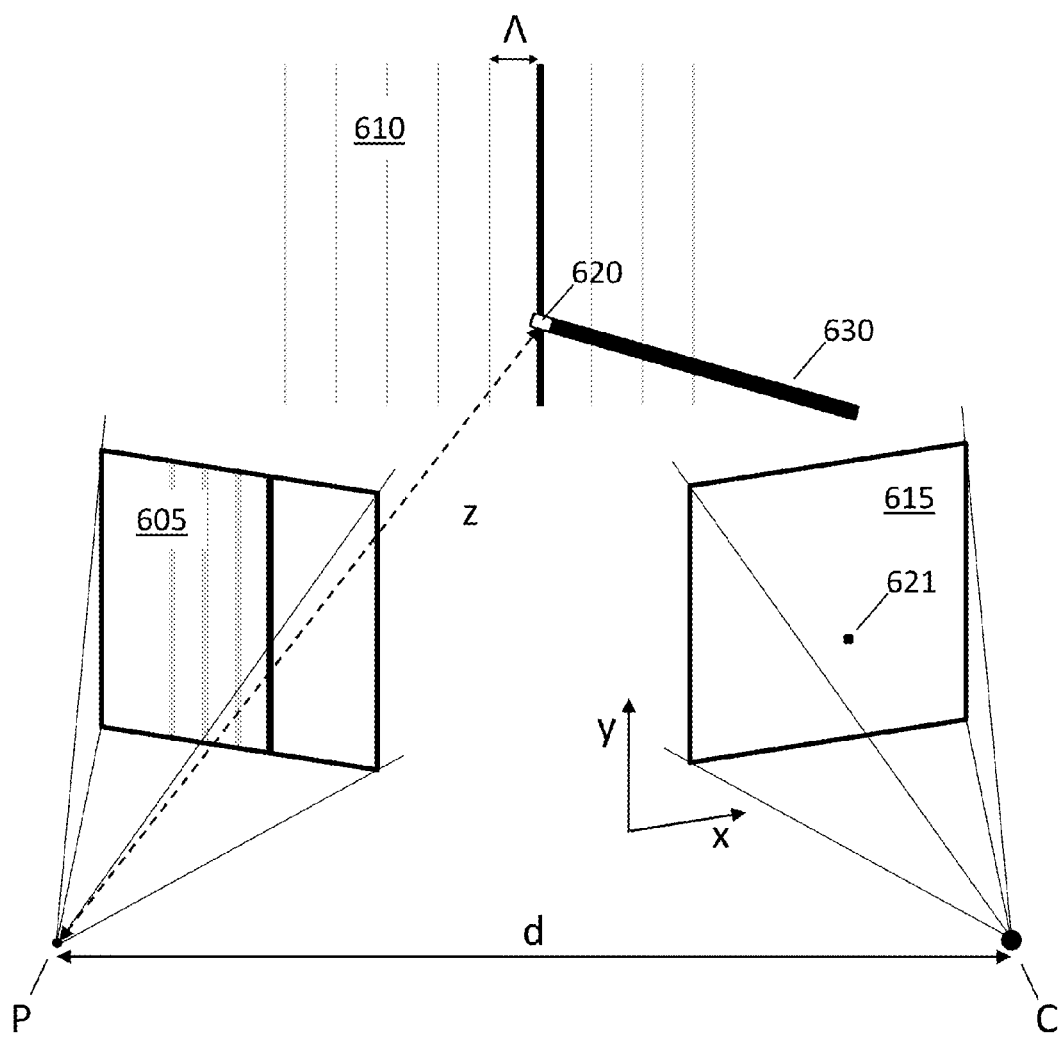
FIG. 6 shows a structured light projector and a single point depth detecting wand.

FIG. 6 shows a structured light projector and a single point depth detecting wand. The system of FIG. 6 offers an alternative to a traditional structured light system. In this system the phase of a projected pattern is measured at one point at a time. The phase of the pattern at the measured point, combined with the location of the point as viewed by a camera, leads to the distance from the projector to the point.

In FIG. 6 a pattern projector located at point "P" generates a sinusoidal stripe pattern 605 that is projected a distance, z, away from the projector. Wand 630 has a fast photo detector 620. A camera at point "C" records the (X, Y) location of the tip of wand 630 (i.e. the location of photo detector 620). Point 621 on the camera's image sensor 615 is the (X, Y) location of photo detector 620. The wand may emit light from its tip to help the camera identify the location of the photo detector. For example, an infrared light emitting diode mounted near the tip of the wand may be used to identify the tip in camera images.

The distance z (or changes in distance $\Delta z$) from the projector at point "P" to the tip of the wand may be determined from the phase of structured light patterns at the tip and the tip's transverse position (X coordinate in the example of FIG. 6) in relation to the pattern. Demodulation of the signal received by the photo detector may be performed in the wand or in an external system. Of course the wand need not have the shape shown in FIG. 6. On the contrary, any structure supporting the photo detector is acceptable. Any number of hand held devices having a photo detector, an optional light emitter, and an optional demodulator, could be components of advanced human interface devices.

Let us turn now to synchronous detection techniques for structured light systems. These detection techniques improve the signal to noise ratio in structured light systems thereby permitting operation in the presence of interfering light sources. When a fast, linear light modulator is used in a structured light pattern generator, synchronous detection also improves the acquisition rate for depth information.

Figure 7:
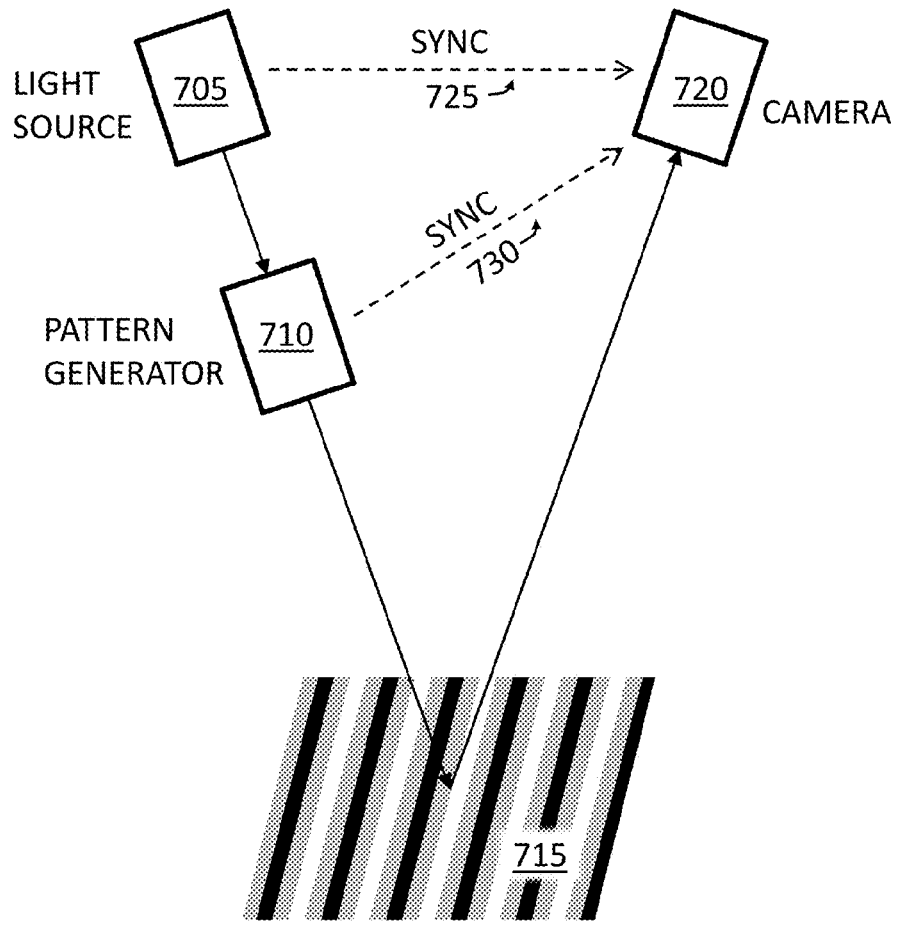
FIG. 7 illustrates different modulation and synchronous detection schemes in a structured light system.

FIG. 7 illustrates different modulation and synchronous detection schemes in a structured light system. Light source 705 and pattern generator 710 project sinusoidally varying structured light pattern 715. A camera 720 records the appearance of the pattern when it is projected on three dimensional objects. As discussed in connection with FIG. 1, recovery of depth information depends on using the camera (or a camera and an external demodulator) to determine the spatial phase of pattern 715.

Two different ways to use synchronous detection in camera 720 are now described. One technique uses a light source that is modulated at high speed and a conventional "slow" pattern generator. In this case sync signal 725 is sent from the light source modulator to the camera. A second technique uses a continuous wave light source and a fast pattern generator based on a fast, linear array light modulator such as a linear array micromechanical ribbon light modulator. In this case sync signal 730 is sent from the pattern generator to the camera. The frequency of a sync signal is phase locked to the driving frequency of the light source modulator or pattern generator as the case may be. Demodulation may be performed in the camera, or in an external demodulator using image data obtained by the camera.

The two techniques yield different improvements over conventional systems. Both techniques are compatible with systems in which a camera is used to determine lateral (X, Y) and depth (Z) information, and with systems in which a camera is used to determine lateral (X, Y) information while a wand is used to determine depth (Z) information. Before discussing the details of the two synchronous detection schemes it is instructive to take a closer look at structured light patterns.

Figure 8:
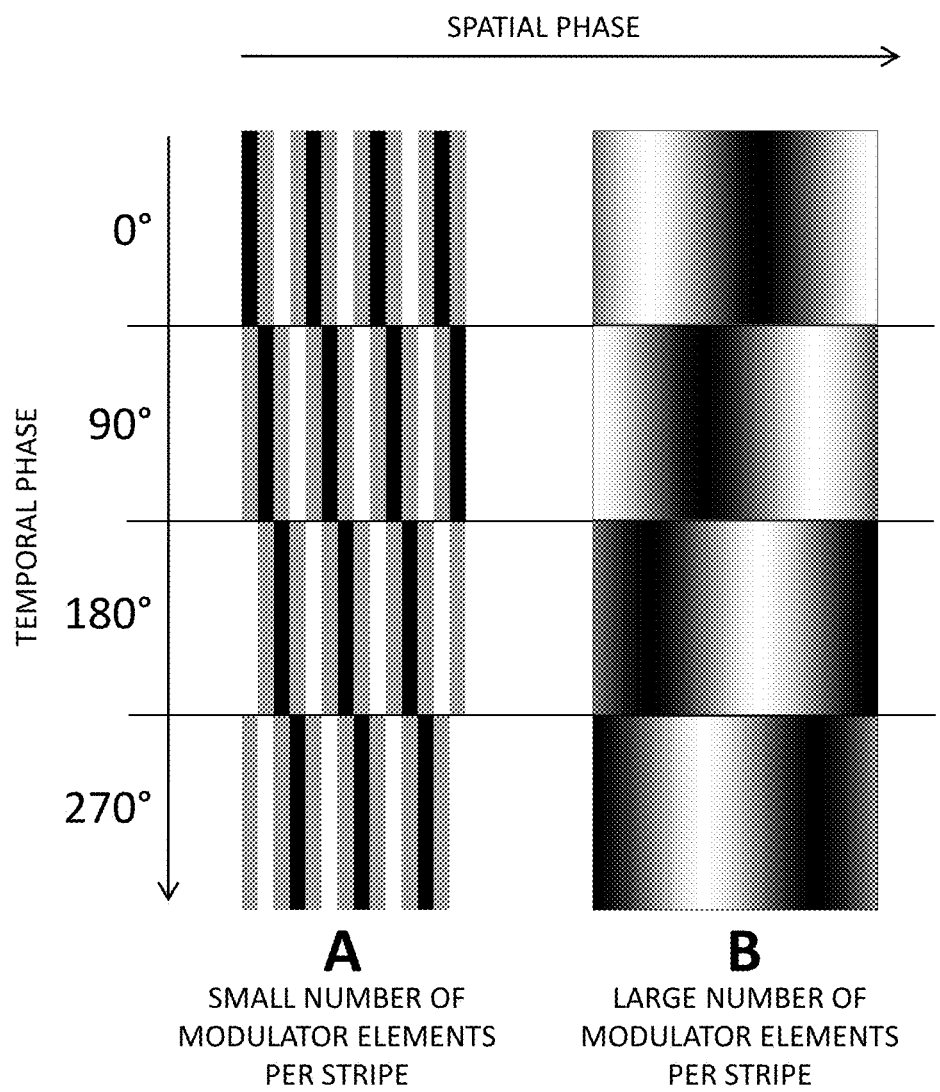
FIG. 8 shows examples of structured light patterns.

FIG. 8 shows examples of structured light patterns. One example pattern is shown in column "A" and another is shown in column "B". The spatial phase axis shows the variation of brightness in a pattern versus position. The temporal phase axis shows the variation of brightness in a pattern versus time. In FIG. 8, the spatial phase axis is continuous, but the temporal phase is shown only at four discrete times identified by their phases: 0, 90, 180 and 270 degrees. A typical pattern generator generates four phases in sequence as shown in FIG. 8; however, any greater number of phases may also be used. Further, it is possible to use as few as three phases (e.g.: 0, 120, and 240 degrees). The rate at which a pattern generator generates phases of a pattern is the pattern generator's repetition rate.

The patterns in column "B" are typical of what may be generated by a pattern generator when the number of "stripes" in the projected pattern is significantly less than the number of modulator elements; i.e. the number of modulator elements is roughly ten or more times the number of stripes in the pattern. When the number of modulator elements per stripe (i.e. per period) of the pattern is reduced, a pattern such as that shown in column "A" results. The minimum number of modulator elements per pattern period is three or four depending on how many phases are generated by the pattern generator.

Figure 9:
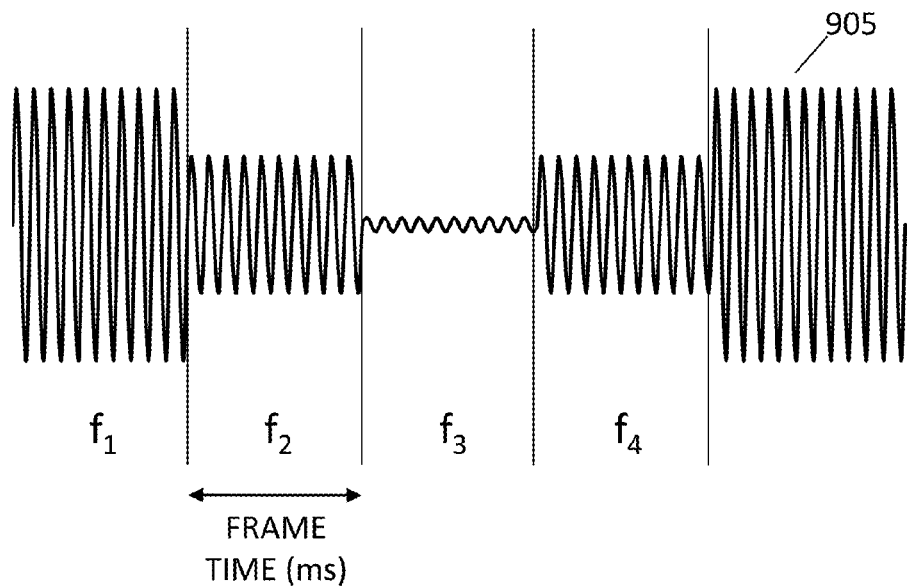
FIG. 9 illustrates optical signals appearing in a structured light system having a fast light source modulator.

First consider a structured light system in which the light source (e.g. light source 705 in FIG. 7) is capable of being modulated at a high rate, i.e. anywhere from roughly 10 kHz to roughly 100 MHz. The actual modulation rate may be less than the maximum possible rate. Examples of light sources that may be suitably modulated include light emitting diodes, super luminescent diodes, or lasers. FIG. 9 illustrates optical signals appearing in a structured light system having a fast light source modulator. In FIG. 9, waveform 905 shows the (AC coupled) amplitude of an optical signal projected from a pattern generator as a function of time as measured at one point in space, for example a point on a three-dimensional object illuminated by a pattern. The waveform is divided into frames, $f_1$ through $f_4$. Each frame of waveform 905 corresponds to one phase of a pattern such as the patterns of FIG. 8. During each frame many cycles of modulated light are received each having the same amplitude. As an example, if the frame rate of the pattern generator is 100 Hz and the modulation rate of the light source is 100 kHz, then each frame will contain 1,000 modulation cycles.

To deduce the phase of a stripe pattern, a camera must determine the brightness of points in the pattern. In the case of fast light modulation as shown in FIG. 9 this may be done by detecting the envelope of waveform 905; i.e. the magnitude of the waveform during each frame. A reference frequency signal from the light modulator may be mixed with waveform 905. Low pass filtering the mixer products provides the envelope signal. In FIG. 9 the magnitude of waveform 905 is measured during frames $f_1$ through $f_4$. In phase (I) and quadrature (Q) signals representing the projected pattern may be obtained, for example, by taking the difference of magnitudes measured during frames $f_1$ and $f_3$, and $f_2$ and $f_4$, respectively. The phase of the pattern is obtained from:

$$\phi = \tan^{-1}\left(\frac{I}{Q}\right).$$

This form of "lock-in" detection enhances signal to noise ratio in a structured light system having a conventional pattern generator. Interference from room lighting modulated at 60 Hz is greatly attenuated, for example. The speed with which the system deduces depth information from structured light patterns is the same as in a conventional system, however, because the frame rate has not changed.

Figure 10:
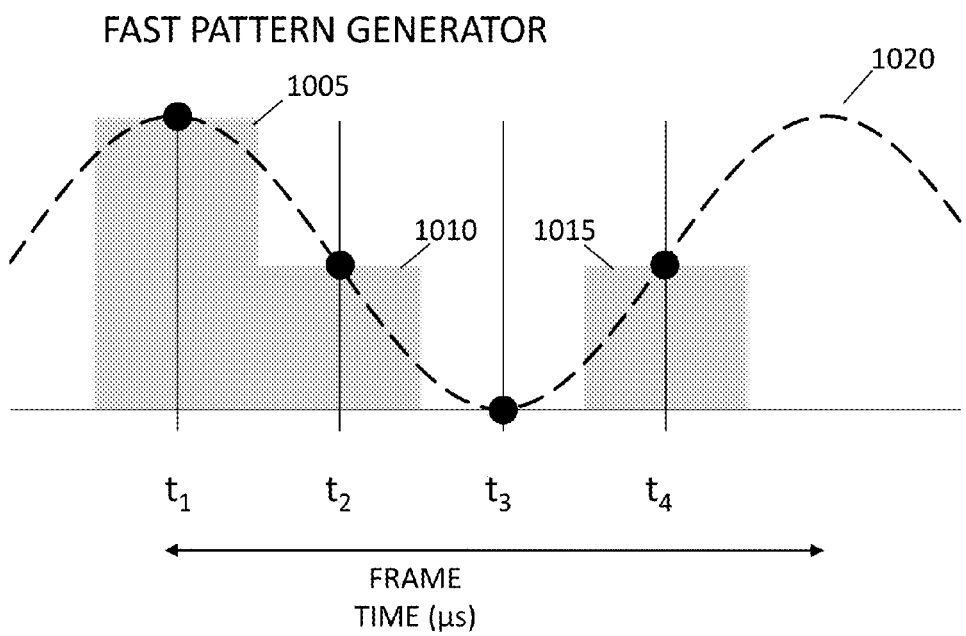
FIG. 10 illustrates optical signals appearing in a structured light system having a fast pattern generator.

A pattern generator based on a fast, linear array light modulator may be used to create a structured light system having improved signal to noise characteristics and also increased frame rate. Such a system can acquire depth information faster than conventional systems. FIG. 10 illustrates optical signals appearing in a structured light system having a fast pattern generator.

In FIG. 10, bars 1005, 1010, and 1015 show the magnitude of an optical signal projected from a pattern generator as a function of time as measured at one point in space. The pattern generator projects 0, 90, 180 and 270 degree phases of a pattern sequentially as shown in FIG. 8. The magnitude of the pattern is sampled at times $t_1$ through $t_4$. (The magnitude is zero at time $t_3$.) Waveform 1020 is a sinusoidal fit to bars 1005-1015. The period of the wave, which is the period of the fast pattern generator, may be as short as roughly 0.1 μs; typical pattern periods may be 0.1 μs to approximately 100 μs long.

The phase of the wave may be obtained by mixing with a reference frequency signal from the pattern generator. The reference frequency or sampling rate is four times greater than the frame rate. (Sampling three times faster than the frame rate is also possible.) In FIG. 10 the pattern is sampled at times $t_1$ through $t_4$. In phase (I) and quadrature (Q) signals may be obtained, for example, by taking the difference of values sampled at times $t_1$ and $t_3$, and $t_2$ and $t_4$, respectively. Equivalently, I and Q may be obtained by mixing with the reference signal from the pattern generator, and with a 90-degree-delayed replica of that signal. The phase of the pattern (or equivalently, the phase of waveform 1020) is obtained from:

$$\phi = \tan^{-1}\left(\frac{I}{Q}\right).$$

Thus a fast pattern generator permits synchronous detection of the phase of the projected light pattern. Fast light source modulation with a conventional pattern generator permits synchronous detection of the intensity of the projected light pattern. It does not change the rate of acquisition of phase information, but it does improve the resistance of the system to interference from ambient light.

Fast pattern generator and fast light source modulation techniques may each be used in traditional projector and camera set-ups or with a point sampling wand such as shown in FIG. 6. Fast pattern generators, based on fast, linear array light modulators create a new operating mode for structured light systems. Fast light source modulation allows structured light systems to operate with better signal to noise performance than previously possible.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A structured light system comprising:
   a light source that generates light;
   a linear array spatial light modulator that modulates light from the light source to create line images, the modulator operating at a reference frequency;
   an anamorphic optical system that spreads the line images into a two-dimensional spatial pattern having variations in only one direction, the pattern being characterized by a spatial phase;
   a photo detector system that demodulates the spatial phase of the pattern one point at a time by sampling the pattern synchronously with the reference frequency, the photo detector system having a sampling rate equal to the reference frequency; and,
   a camera that detects the transverse location of the photo detector system in the pattern.

2. The system of claim 1 further comprising a second light source mounted with the photo detector system that identifies the location of the photo detector to the camera.

3. The system of claim 2 wherein the second light source emits infrared light.

4. The system of claim 1, the linear array light modulator comprising an array of micromechanical ribbons.

5. The system of claim 1, the photo detector system forming in-phase (I) and quadrature (Q) signals from pattern samples and calculating phase according to $$\phi = \tan^{-1}\left(\frac{I}{Q}\right).$$

6. The system of claim 1, the reference frequency being at least two megahertz.

7. A structured light system comprising:
   a light source that generates light modulated at a modulation frequency;
   a linear array spatial light modulator that modulates light from the light source to create line images;
   an anamorphic optical system that spreads the line images into a two-dimensional spatial pattern having variations in only one direction, the pattern being characterized by a spatial phase;
   a photo detector system that demodulates the spatial phase of the pattern one point at a time by sampling the amplitude of the point at the modulation frequency, the photo detector system having a sampling rate equal to the modulation frequency; and,
   a camera that detects the transverse location of the photo detector system in the pattern.

8. The system of claim 7, the sampling comprising mixing a detected optical amplitude waveform with the modulation frequency and low-pass filtering to produce an envelope signal.

9. The system of claim 7, the light source being a light emitting diode, a superluminescent diode, or a laser.

10. The system of claim 7, the modulation frequency being greater than ten kilohertz.

11. The system of claim 7 further comprising a second light source mounted with the photo detector system that identifies the location of the photo detector system to the camera.

12. The system of claim 11 wherein the second light source emits infrared light.

13. The system of claim 7, the linear array light modulator comprising an array of micromechanical ribbons.

* * * * *